US009403504B2

United States Patent
Umehara et al.

(10) Patent No.: US 9,403,504 B2
(45) Date of Patent: Aug. 2, 2016

(54) AIRBAG AND AIRBAG DEVICE (71) Applicant: NIHON PLAST CO., LTD., Fujinomiya-shi, Shizuoka (JP)

(72) Inventors: Junichi Umehara, Fujinomiya (JP); Tomoki Takahashi, Fujinomiya (JP); Chiari Saito, Fujinomiya (JP)

(73) Assignee: NIHON PLAST CO., LTD., Fujinomiya-shi (JP)

( * ) Notice: Subject to any disclaimer, the term of this patent is extended or adjusted under 35 U.S.C. 154(b) by 0 days.

(21) Appl. No.: 14/753,122

(22) Filed: Jun. 29, 2015

(65) Prior Publication Data
US 2015/0375711 A1    Dec. 31, 2015

(30) Foreign Application Priority Data

Jun. 30, 2014   (JP) .................................. 2014-135210

(51) Int. Cl.
*B60R 21/239* (2006.01)
*B60R 21/2338* (2011.01)

(52) U.S. Cl.
CPC ....... *B60R 21/239* (2013.01); *B60R 2021/2395* (2013.01); *B60R 2021/23384* (2013.01)

(58) Field of Classification Search
CPC .................. B60R 21/239; B60R 2021/23384; B60R 2021/2395
See application file for complete search history.

(56) References Cited

U.S. PATENT DOCUMENTS

| | | | | |
|---|---|---|---|---|
| 2008/0258447 A1* | 10/2008 | Hall | .................... | B60R 21/2338 280/743.2 |
| 2009/0121460 A1* | 5/2009 | Abe | ....................... | B60R 21/233 280/728.3 |
| 2009/0206587 A1* | 8/2009 | Abe | ....................... | B60R 21/231 280/743.1 |
| 2010/0001495 A1* | 1/2010 | Sekino | .................. | B60R 21/231 280/729 |
| 2010/0032931 A1* | 2/2010 | Kumagai | ............ | B60R 21/2338 280/742 |
| 2010/0201107 A1* | 8/2010 | Abe | .................... | B60R 21/2338 280/730.1 |
| 2011/0101652 A1* | 5/2011 | Abe | .................... | B60R 21/2338 280/728.3 |
| 2012/0074677 A1* | 3/2012 | Hiruta | ................. | B60R 21/2338 280/739 |
| 2014/0300094 A1* | 10/2014 | Williams | .............. | B60R 21/239 280/743.2 |
| 2015/0283971 A1* | 10/2015 | Fischer | ............... | B60R 21/2338 280/742 |

FOREIGN PATENT DOCUMENTS

JP   2010-036770 A   2/2010

* cited by examiner

*Primary Examiner* — Drew Brown
(74) *Attorney, Agent, or Firm* — Mots Law, PLLC (57) ABSTRACT

A vent hole communicating with an air chamber is opened in an airbag main body. A cover is disposed outside the air chamber of the airbag main body with respect to the vent hole. One end of the tether is connected to the cover via the vent hole, and the other end is connected to the airbag main body. If the tether is not pulled by the airbag main body, the vent hole is reliably opened to discharge gas to the outside. If the tether is pulled by the deployed airbag main body, the cover is partially drawn into the vent hole so that the cover is ensured to be in tight contact with the edge of the vent hole so as to reliably seal the vent hole.

6 Claims, 9 Drawing Sheets

AIRBAG AND AIRBAG DEVICE

BACKGROUND

1. Technical Field

The present invention relates to an airbag having an airbag main body provided with an air chamber which expands from a folded state by introduced gas, and an airbag device equipped with the airbag.

2. Related Art

An airbag device installed in the steering wheel or the instrument panel for an automobile has been well known. The airbag device includes an inflator for supplying gas, and an airbag with an airbag main body formed into a predetermined bag-like shape in a folded state. In case of an automobile crash, gas is supplied from the inflator to expand and deploy the airbag main body to the front of the occupant so as to alleviate the impact on the occupant.

There has been a known airbag configured to open or close the exhaust hole or vent hole with a lid in accordance with the occupant restrained state so that the internal pressure of the airbag main body is appropriately adjusted. In the airbag, one side of the lid is fixed to an outer side surface of the airbag main body, and the other side of the lid is connected to one end of a tether as a connector. The one end of the tether is connected to the other side of the lid, while being inserted into a slit formed around the vent hole. The other end of the tether is connected to the rear surface of the occupant restraining surface for restraining the occupant. In accordance with the state where the occupant is restrained against the occupant restraining surface, tensile force of the tether to pull the lid varies to switch between opened and closed states of the vent hole by means of the lid (for example, see Patent Document 1).

PRIOR ART DOCUMENT

Patent Document

[Patent Document 1] Japanese Patent Application Publication No. 2010-36770 (pp. 7-12, FIGS. 1-2)

SUMMARY

Problems to be Solved by the Invention

Even if the vent hole of the aforementioned type airbag is sealed with the lid, gas may escape from the slit through which the tether is inserted, which weakens the pressing force of the lid applied to the outer periphery of the vent hole.

The airbag is structured that the tether serves to pull the lid at a distance unless the slit is set at the adjacent position of the vent hole. In such a state, the sealing force of the lid to the vent hole is likely to be insufficient. On the contrary, if the slit is located adjacent to the vent hole, the shape of the airbag main body around the vent hole is brought into the unstable state, resulting in difficulty in seal of the vent hole with the lid.

In the circumstances as described above, there has been demanded the structure for appropriately adjusting the opening degree of the vent hole so as to set the internal pressure of the airbag main body more suitably in accordance with the restrained state of the occupant.

The present invention has been made in view of the above point and aims to provide an airbag configured to appropriately set the internal pressure of the airbag main body by ensuring opening and closing of the exhaust hole, and the airbag device equipped with the airbag.

Means to Solve the Problem

In order to solve the above problem, an airbag of the present invention includes an airbag main body provided with an air chamber which expands from a folded state by introduced gas, and a gas distribution mechanism disposed on the airbag main body for controlling quantity of gas to be discharged from the air chamber to outside in accordance with a deployment state of the airbag main body. The gas distribution mechanism includes an exhaust hole communicating with the air chamber and opened in the airbag main body, a lid located outside the air chamber in the airbag main body with respect to the exhaust hole, and a connector having one end connected to the lid via the exhaust hole, and the other end connected to the airbag main body for drawing a part of the lid into the exhaust hole by the deployment of the airbag main body.

The airbag according to the present invention may be configured that the lid has a pair of lid main bodies located on the edge of the exhaust hole, and the connector is connected between the lid main bodies.

The airbag according to the present invention may be configured that the lid has a flexible spacer that faces an outer part of the airbag main body, and abuts on the airbag main body to form a gap between the spacer and the airbag main body.

The airbag according to the present invention is configured that the lid is formed of the member that is less deformable than the member constituting the airbag main body.

In order to solve the aforementioned problem, the airbag device includes the airbag having the feature as described above, and an inflator for supplying gas to the air chamber of the airbag.

DETAILED DESCRIPTION

A first embodiment of the airbag and the airbag device according to the present invention will be described below with reference to the drawings.

Referring to FIGS. 1 to 5, 6A, 6B, and 7A to 7D, an airbag 10 constitutes an airbag device 11. The airbag device 11 is installed in a main body of a not shown steering wheel serving as a mounted member for a vehicle or an automobile so that an occupant A as a subject to be protected is kept from being damaged. The main body of the steering wheel is mounted to an inclined steering shaft so as to be operated in the inclined manner.

Explanations will be made hereinafter, taking the side of the subject to be protected with respect to the airbag device 11 referred to as an occupant A side, an upper side or a front surface side, and the other side opposite the occupant A side referred to as a vehicle body side, a lower side, a bottom surface side, or a rear side.

The steering wheel main body includes an annular rim portion serving as a gripper, which is called the grip member or a ring member, a boss member located at the inner side of the rim portion, and three or four spokes for connecting the rim portion and the boss member. A not shown steering shaft is fitted inwardly with a boss of the boss member so as to be fixed. As FIG. 1 indicates, the occupant A is shown as a dummy.

The airbag device 11 may be referred to as an airbag module. The airbag device 11 includes a base plate that constitutes a support member, the airbag 10 mounted on the base plate, an inflator 12, a retainer, a cover body and the like.

The inflator 12 has substantially a general disk-like shape and a known function. The inflator 12 includes an inflator main body 12a with substantially a columnar shape, and a plate-like mount flange portion 12b protruding from the outer circumference of the inflator main body 12a.

The inflator main body 12a positioned at the upper side of the mount flange portion 12b has a plurality of gas injection ports 12c for injecting gas arranged along the outer circumference in a radial pattern. The mount flange portion 12b has bolt mount holes 12d formed at four points communicating with the bolt mount holes formed in the base plate.

The inflator main body 12a is connected to a connector 13a with a top end of a harness 13 at the lower side. A not shown controller is electrically connected via the harness 13 for controlling operations of the inflator 12.

The airbag 10 includes at least one air chamber which expands by introduced gas. The airbag 10 of the embodiment includes a circular bag-like airbag main body 22 having one air chamber 21 formed therein, and a gas distribution mechanism 23 for controlling quantity of gas discharged from the air chamber 21 to outside in accordance with the deployed state of the airbag main body 22.

Figure 1:
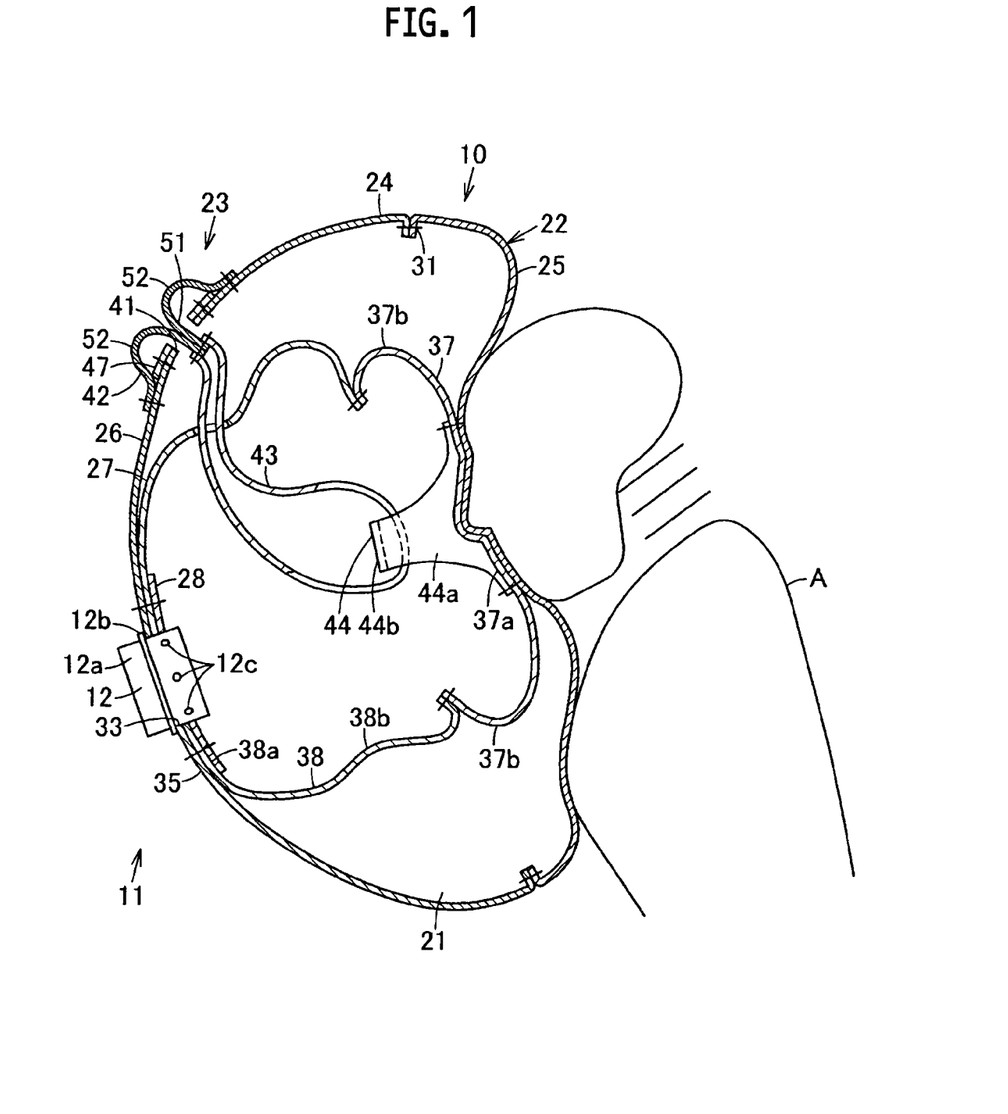
FIG. 1 is a sectional view showing a first embodiment of an airbag device provided with an airbag of the present invention.
Figure 2:
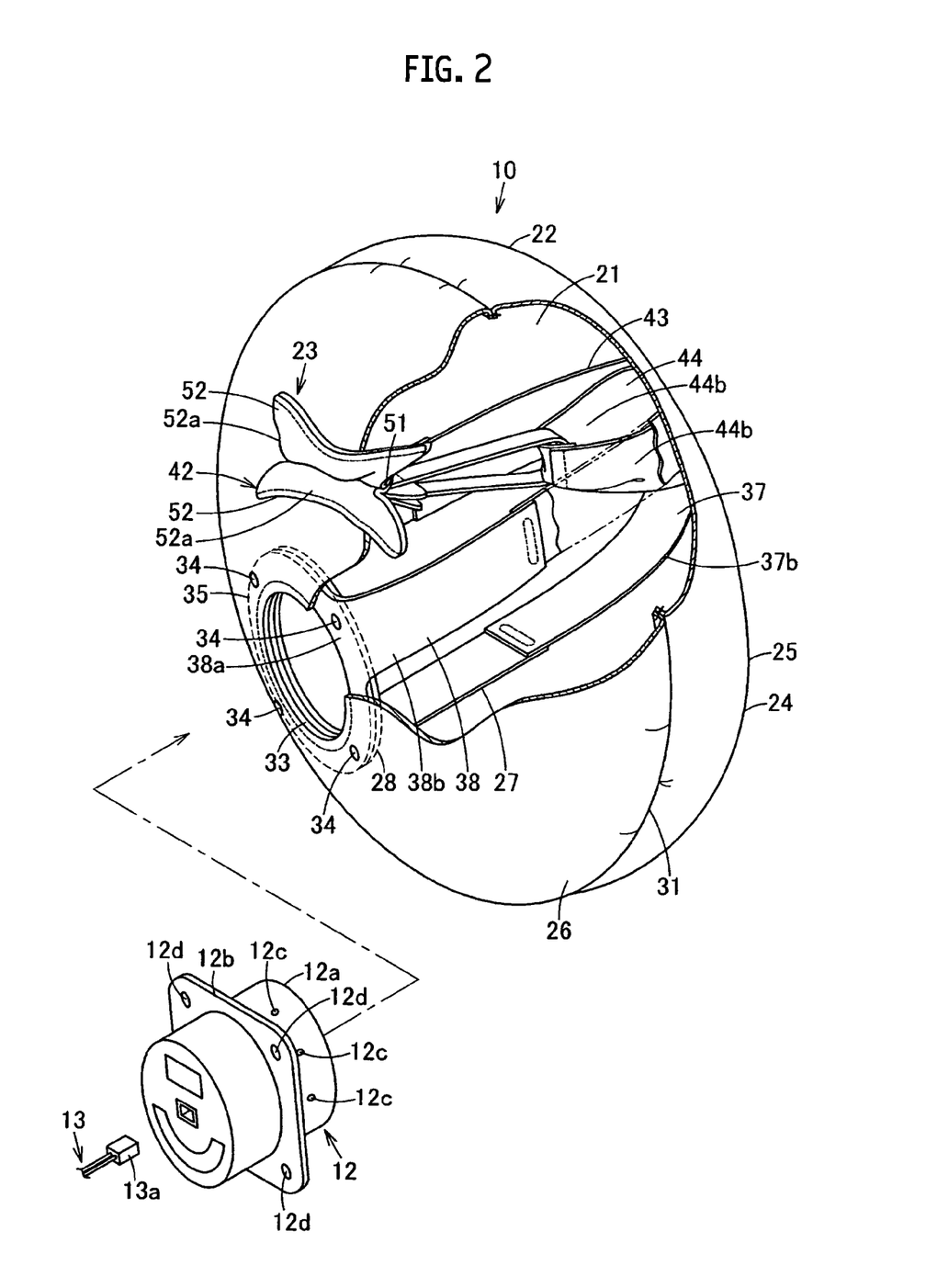
FIG. 2 is an exploded perspective view of the first embodiment of the airbag device provided with the airbag of the present invention, illustrating the airbag in the deployed state by cutting out a part of it.
Figure 3:
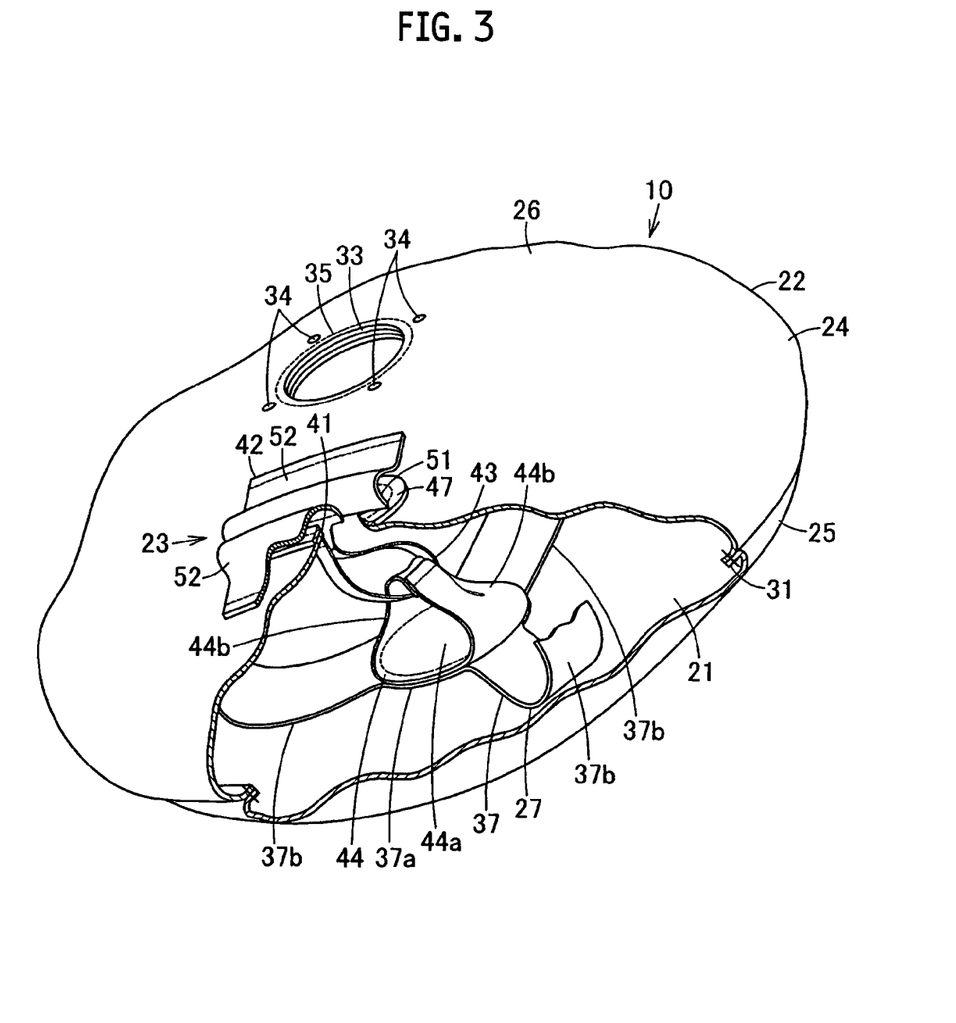
FIG. 3 is a perspective view of the first embodiment of the airbag device provided with the airbag of the present invention, illustrating the airbag main body which has been brought into a slightly deflated state from the deployed state of the airbag shown in FIG. 2, by cutting out a part of the airbag.
Figure 4:
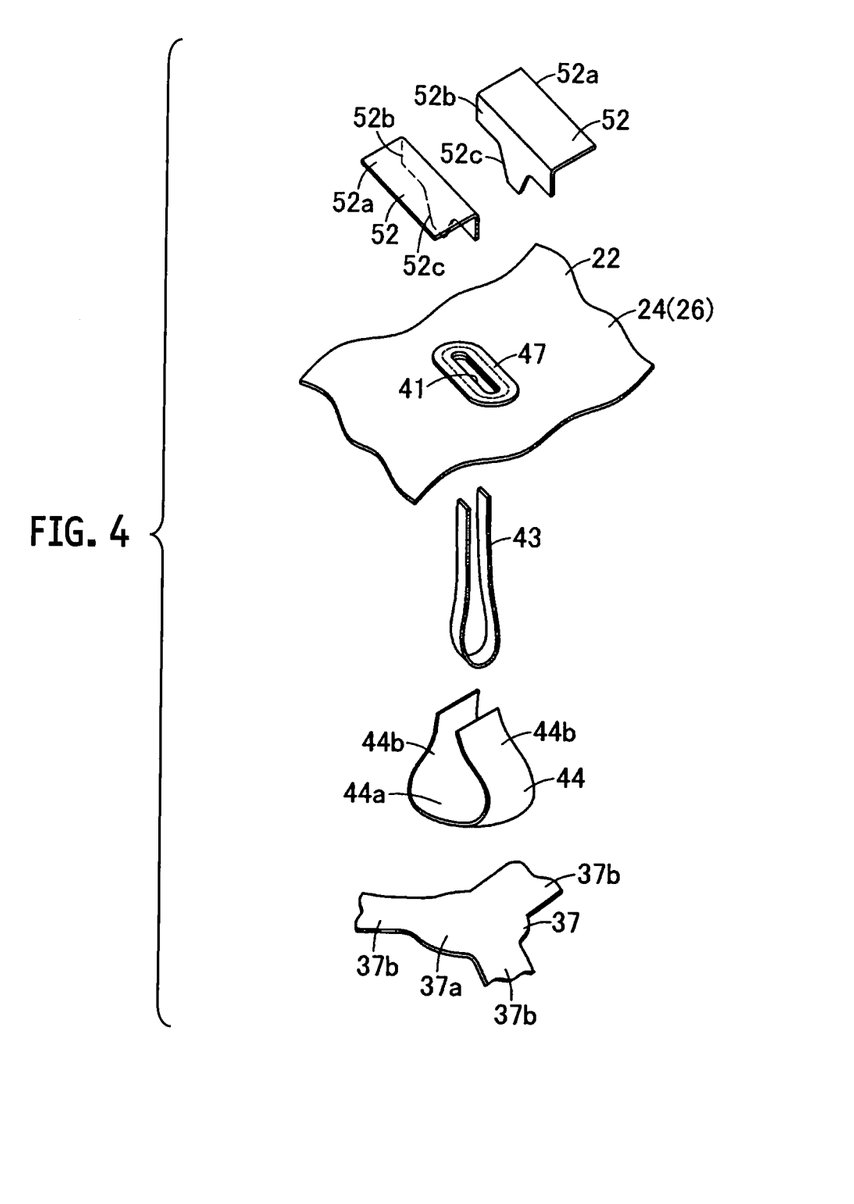
FIG. 4 is an exploded perspective view illustrating a gas distribution mechanism of the airbag in the first embodiment of the airbag device provided with the airbag of the present invention.

As FIGS. 1 to 3 show, the airbag main body 22 includes an occupant side panel 25 as an occupant restraining surface constituting an outer shell panel 24, a base panel 26 which does not face the occupant A, serving as a surface that does not restrain the occupant, a first reinforcing fabric 27, and a second reinforcing fabric 28. Each of those occupant side panel 25, the base panel 26, the first reinforcing fabric 27, and the second reinforcing fabric 28 is made of a woven base fabric, for example, the one formed of nylon (nylon 66), which may also be referred to as the base fabric, panel and plate.

The occupant side panel 25 is arranged to face the side of the occupant A, which is configured to have a simply circular shape.

The base panel 26 is arranged at the vehicle side, which may be referred to as a steering panel. The base panel 26 has a circular shape with the outer diameter dimension substantially the same as that of the occupant side panel 25. The outer circumference of the base panel 26 and the outer circumference of the occupant side panel 25 are joined by sewing along an outer circumferential joint 31. Inside and outside of the thus joined occupant side panel 25 and the base panel 26 are reversed so that the outer circumferential joint 31 is located inside the air chamber 21. The base panel 26 constitutes the outer shell panel 24 with flat bag-like shape.

An inflator mount opening 33 as a circular hole is formed in the center of the base panel 26. The base panel 26 has bolt mount holes 34 as the holes arranged to surround the inflator mount opening 33 for fixing the bag. Those bolt mount holes 34 and the inflator mount opening 33 constitute an annular inflator mount portion 35. In other words, the annular inflator mount portion 35 is formed in the center of the base panel 26.

The first reinforcing fabric 27 is a bag joint member for reinforcing the occupant side panel 25 and the base panel 26, and regulating the deployment dimension of the airbag main body 22 forward by joining the occupant side panel 25 and the base panel 26. The first reinforcing fabric 27 is located inside the airbag main body 22 (air chamber 21). The first reinforcing fabric 27 includes an occupant side reinforcing portion 37 overlaid with the occupant side panel 25 so as to be joined therewith by sewing, for example, and a base side reinforcing portion 38 overlaid with the base panel 26 so as to be joined therewith by sewing, for example.

The occupant side reinforcing portion 37 is integrally provided with a circular occupant side reinforcing main body 37a concentrically overlaid with the center of the occupant side panel 25 so as to be joined therewith, and a plurality of, for example, three straps 37b each protruding from the occupant side reinforcing main body 37a in a radial pattern along the radial direction. Those straps 37b are apart from one another in the circumferential direction at substantially an equal interval, each extending longitudinally downward at the side of the base panel 26.

The base side reinforcing portion 38 is integrally provided with a circular base side reinforcing main body 38a concentrically overlaid with the center of the base panel 26, that is, the inflator mount portion 35 so as to be joined therewith by sewing, for example, and a plurality of, for example, three straps 38b each protruding from the base side reinforcing main body 38a in a radial pattern along the radial direction. The base side reinforcing main body 38a has circular holes corresponding to the inflator mount opening 33 and the bolt mount holes 34. The straps 38b are apart from one another in the circumferential direction at substantially an equal interval, each extending longitudinally upward at the side of the occupant side panel 25, while having a top end joined with the top end of the strap 37b of the occupant side reinforcing portion 37 by sewing, for example, so as to be connected.

The second reinforcing fabric 28 is located at a part required to be reinforced in terms of strength and heat. In the embodiment, the second reinforcing fabric 28 is joined with the upper surface of the inflator mount portion 35 of the base panel 26 by sewing. The second reinforcing fabric 28 has a circular shape with circular holes formed corresponding to the inflator mount hole 33 and the bolt mount holes 34.

The gas distribution mechanism 23 is configured to discharge gas from the air chamber 21 to outside of the airbag main body 22 (air chamber 21) in the initial stage of deployment of the airbag main body 22, or in the state where the occupant A is restrained, and to prevent discharge of the gas from the air chamber 21 in the period from the middle to the late stages of deployment of the airbag main body 22.

As FIGS. 1 to 4 show, the gas distribution mechanism 23 includes a vent hole 41, a cover 42, a tether 43 and a catch panel 44. The vent hole 41 is an exhaust hole opened in a slit shape at a position near the outer periphery of the base panel 26 of the airbag main body 22. The cover 42 is a lid for sealing the vent hole 41. The tether 43 is a connector having one end connected to the cover 42. The catch panel 44 is a connector at the main body side for connecting the other end of the tether 43 to the airbag main body 22 (first reinforcing fabric 27).

The vent hole 41 is opened to allow gas in the air chamber 21 (airbag main body 22) to be discharged outside therefrom. The vent hole 41 is formed beside the inflator mount portion 35 (inflator mount opening 33) in the base panel 26, for example, to have a longitudinal shape (long hole) in the left-to-right direction.

A patch cloth 47 as the peripheral reinforcing member is mounted to the base panel 26 by sewing, for example, at the peripheral edge of the vent hole 41 for reinforcement. The patch cloth 47 as the woven base fabric made from nylon (nylon 66), for example, has an annular shape to surround the periphery of the vent hole 41, and is joined inside the base panel 26, that is, inner side of the air chamber 21 (airbag main body 22) by sewing, for example. The patch cloth 47 reinforces the base panel 26 (airbag main body 22) around the vent hole 41 so as to lessen deformation of the airbag main body 22 (base panel 26) or the like at the location of the vent hole 41.

The cover 42 may be called the valve seat, the exhaust hole cover, or the flap. The cover 42 is made of the woven base fabric which is the same as that (member) for forming the airbag main body 22 (outer shell panel 24 (base panel 26)), or made of the woven base fabric as the woven fabric made from undeformable (hard) nylon (nylon 66) compared with the base fabric (member) for forming the airbag main body 22. The cover 42 has a quadrangle shape sufficiently large to cover the vent hole 41 as a whole, that is, having each dimension of the respective sides larger than those of the vent hole 41. The cover 42 is displayed to have the area larger than the aperture area of the vent hole 41. The cover 42 is formed by joining the respective cover main bodies 52, 52 by sewing with each other. The main bodies 52, 52 are positioned on the edge of the vent hole 41. A main body 52a as a part of the main body 52 is joined with the airbag main body 22 by sewing, and thus the cover 42 is joined with the airbag main body 22. Joint parts between the cover 42 and the airbag main body 22 are positioned on the edge of the vent hole 41 sandwiched or surrounded by the joint parts, and the joint parts are positioned on both sides of the vent hole 41. In this way, the cover 42 covers the vent hole 41 as a whole.

Figure 5:
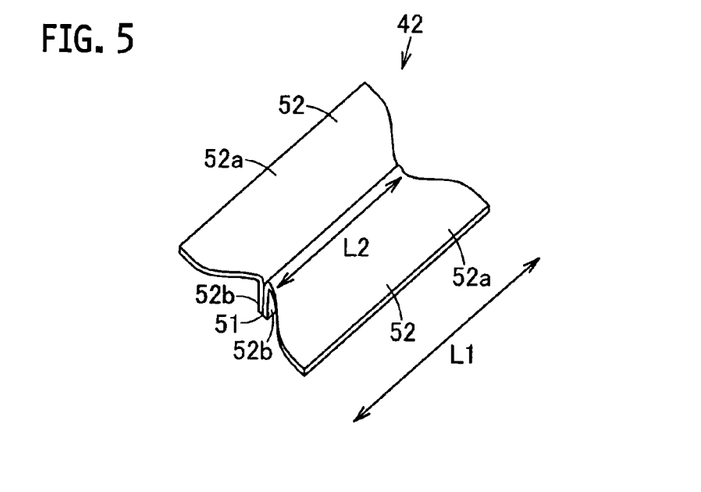
FIG. 5 is a perspective view illustrating a lid of the airbag in the first embodiment of the airbag device provided with the airbag of the present invention.

The cover 42 extends across the vent hole 41 in the lateral direction, while having both lateral ends of the vent hole 41 joined with the airbag main body 22 by sewing. The center of the cover 42 is formed into a bent portion 51 as a spacer protruding toward the airbag main body 22. Assuming that the dimension of the lateral end (long side) of the cover 42, which is fixed to the airbag main body 22 is designated as L1, and the longitudinal dimension of the cover 42 at the bent portion 51 as the center of both ends is designated as L2, the cover 42 is configured to have the dimension L2 shorter than the dimension L1 (FIG. 5). In the embodiment, this cover 42 is formed by joining the respective cover main bodies 52, 52 as a pair of lid main bodies (one and the other) by sewing.

Figure 6A:
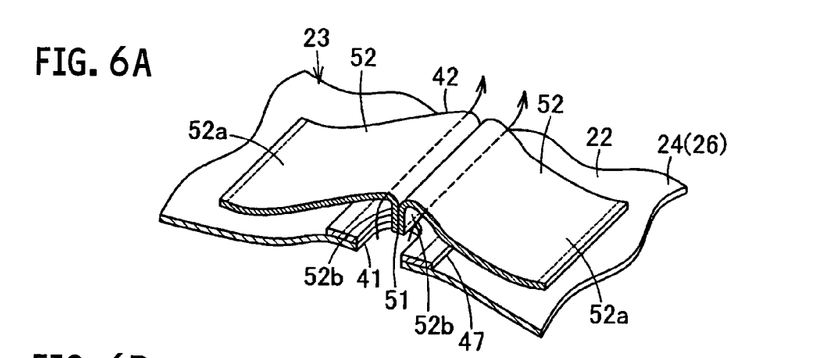
FIG. 6A is a perspective view partially illustrating the state where tension of a connector is relatively low, in the first embodiment of the airbag device provided with the airbag of the present invention.
Figure 6B:
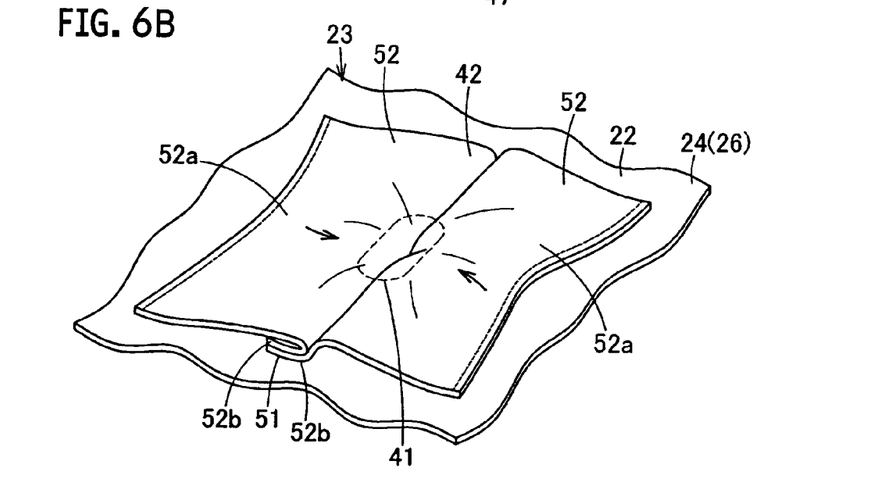
FIG. 6B is a perspective view partially illustrating the state where the tension is applied to the connector, in the first embodiment of the airbag device provided with the airbag of the present invention.

The bent portion 51 is flexible and continuous over a whole length of the cover 42 in the longitudinal direction. The bent portion 51 makes the view of the cover 42 with substantially M-like shape when seen from the longitudinal end side. In the state where no tension is applied to the cover 42 via the tether 43, the top end of the bent portion 51 abuts on the airbag main body 22 to form the gap with respect to the airbag main body 22. In the state where the tension is applied to the cover 42 via the tether 43, the bent portion 51 falls down so as not to generate the gap with respect to the airbag main body 22 (FIGS. 6A and 6B).

The cover main bodies 52, 52 have substantially the same shapes, and are positioned at the lateral ends with respect to the vent hole 41 while facing each other. Each of the cover main bodies 52 has a main body 52a with substantially quadrangle (trapezoidal) shape joined with the airbag main body 22, a continuous portion 52b as a rectangular spacer forming portion continuing with the long side of the main body 52a, and a tab 52c, which are integrally formed. The tab 52c protrudes at substantially center of the long side of the continuous portion 52b opposite the main body 52a in the longitudinal direction so that the trapezoidal shape is formed, for example. Each of the cover main bodies 52 has substantially a convex shape. The main body 52a is formed to have the longitudinal dimension gradually reduced toward the continuous portion 52b.

Those cover main bodies 52, 52 are configured to have the continuous portions 52b, 52b bent at substantially right angles with respect to the main bodies 52a, 52a while facing each other, which will be overlaid and joined by sewing integrally to form the bent portion 51. The tabs 52c, 52c are joined with the tether 43 by sewing, and the tabs 52c, 52c are connected with the tether 43.

The bent portion 51 is twice as thick as the cover 42 (cover main body 52). Each of the tabs 52c, 52c has the width dimension smaller than the longitudinal dimension of the vent hole 41 so as to be able to be drawn to the inside of the airbag main body 22 from the vent hole 41.

The tether 43 as the woven base fabric is made from nylon (nylon 66) which is the same as the base fabric (member) for forming the airbag main body 22, for example. It is formed into a longitudinal (belt-like) shape, while having both ends folded back to be joined with the respective tabs 52c, 52c by sewing into the loop shape. The tether 43 is set to have the length to sufficiently apply tension (tensile force) to the cover 42 at maximum expansion in the middle or late stage of deployment of the airbag main body 22, that is, in the state where the airbag main body 22 is deployed to the level equal to or greater than specified. Therefore, the tether 43 is designed to be loosened in the case where the airbag main body 22 is in the folded state (non-deployed state) or the occupant A is in the restrained state.

The catch panel 44 is fixed to the airbag main body 22 so as to be connected to the other end of the tether 43, which is the woven base fabric made from nylon (nylon 66) similar to the base fabric (member) for forming the airbag main body 22, for example. The catch panel includes a circular panel main body 44a, and a pair of arms 44b, 44b each protruding like a tongue at opposing outer edges of the panel main body 44a, that is, both radial ends of the panel main body 44a, which are integrally formed.

The panel main body 44a is overlaid with the occupant side reinforcing main body 37a of the occupant side reinforcing portion 37 of the first reinforcing fabric 27 concentrically, which will be integrally joined with the first reinforcing fabric 27 and the occupant side panel 25, by sewing for example.

The arms 44b, 44b are joined by sewing the respective top ends to form a loop shape of the catch panel 44 as a whole to accommodate insertion of the other end of the loop-like tether 43, and the arms 44b, 44b hold the other end of the tether 43 moveably.

The retainer is formed from metal or resin, for example, having a mount bolt protruding so as to be inserted into the bolt mount holes 12d, 34.

The cover body is made from a soft synthetic resin material, for example, so that the specified door is formed by expansion of the airbag 10.

The airbag 10 is manufactured by executing steps of sewing the first reinforcing fabric 27, the second reinforcing fabric 28, the catch panel 44 and the patch cloth 47 to the respective panels 25, 26, inserting the tabs 52c, 52c of the cover 42 to which the continuous portions 52b, 52b of the cover main bodies 52, 52 are sewn from the vent hole 41 so that both ends of the tether 43 are sewn to those tabs 52c, 52c to form the loop, and thereafter inserting the arms 44b, 44b of the catch panel 44 into the loop of the tether 43 so as to be sewn to each other. Thereafter, the outer circumferential edge of the occupant side panel 25 and the base panel 26 are sewn at the outer circumferential joint 31. Then the occupant side panel 25 is drawn from the inflator mount opening 33, and front and rear surfaces of the occupant side panel 25 and the base panel 26 are inverted so that the outer circumferential joint 31 is located inside the air chamber 21.

In assembling the airbag device 11, the retainer is inserted into the air chamber 21 of the airbag 10 so that the mount bolt is inserted into the bolt mount hole 34 from above. The airbag 10 is further combined with the base plate and the inflator 12 to form the airbag device 11. The assembly work is implemented by aligning the base plate with the lower side of the airbag 10 so that the mount bolt is inserted into the bolt mount hole of the base plate while aligning the mount flange portion 12b of the inflator 12 with the lower side of the base plate. The mount bolt is inserted into the bolt mount hole 12d of the mount flange portion 12b, and a not shown nut is screwed from the top end of the mount bolt for tightening. In the aforementioned state, the upper side of the inflator main body 12a of the inflator 12 is inserted to the inside of the airbag 10. Then the gas injection port 12c is located in the air chamber 21.

Further, before and after the aforementioned mount operation of the inflator 12, the airbag 10 is folded into a predetermined shape like a petal, and is covered with a cover body from above for fitting to assemble the airbag device 11. The airbag device 11 is installed in the steering wheel by fixing a mount piece disposed on the base plate to a core bar of the boss member of the steering wheel main body using the bolt.

If impact of collision is exerted to the automobile having the airbag device 11, the inflator 12 is activated by a not shown controller so that gas is immediately injected from the gas injection port 12c of the inflator 12 into the air chamber 21 of the airbag main body 22 of the airbag 10. Then the airbag 10 will rupture the cover body in the door-like manner along the tear line to form a projection port. It is expanded via the projection port to be further expanded to form a predetermined shape to the front of the occupant A.

Figure 7A:
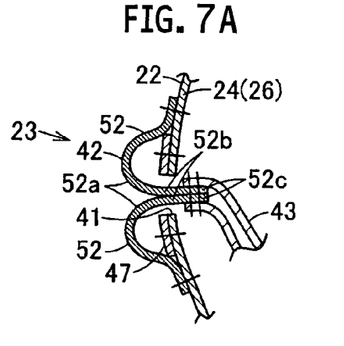
FIG. 7A is a sectional view partially illustrating the gas distribution mechanism in the state where the tension of the connector is relatively low, in the first embodiment of the airbag device provided with the airbag of the present invention.
Figure 7B:
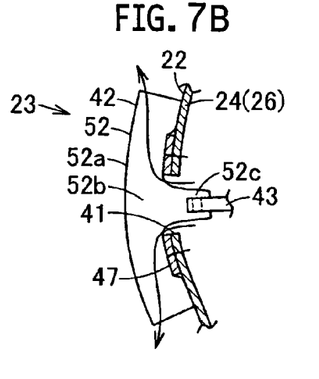
FIG. 7B is a sectional view of the mechanism in the orthogonal direction in FIG. 7A.
Figure 7C:
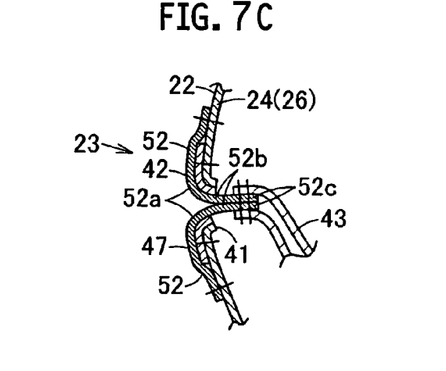
FIG. 7C is a sectional view partially illustrating the state where the tension is applied to the connector, in the first embodiment of the airbag device provided with the airbag of the present invention.
Figure 7D:
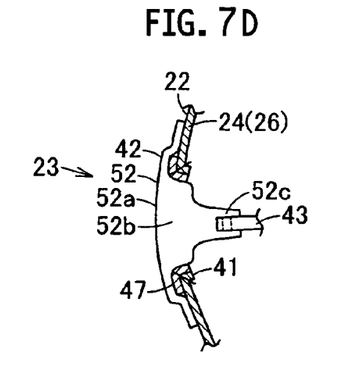
FIG. 7D is a sectional view of the mechanism in the orthogonal direction in FIG. 7C.

The expansion and deployment of the airbag 10 (airbag main body 22) allows the occupant side panel 25 to pull the tether 43 normally in the loosened state in the non-deployed state via the catch panel 44 so that a tension is applied. As a result, the cover 42 is pulled to the vent hole 41 side to fall the bent portion 51. The cover 42 (cover main bodies 52, 52) allows the tabs 52c, 52c to have peripheral parts drawn to the inside of the vent hole 41 to be located in the airbag main body 22 (air chamber 21) while being deformed. In the state where the cover 42 (cover main bodies 52, 52) overlaid with the airbag main body 22 covers the vent hole 41, the main bodies 52a, 52a are brought into pressure contact with the peripheral edge of the vent hole 41 so as to seal the vent hole 41 (FIGS. 6B, 7C, 7D). Thus, the internal pressure of the airbag 10 (airbag main body 22) is kept relatively high.

The occupant side panel 25 of the thus deployed airbag 10 (airbag main body 22) receives and restrains the occupant A thrown forward so that the impact exerted to the occupant A is alleviated. At the moment, the occupant side panel 25 is pushed so that the tension applied to the tether 43 having its end retained (connected) to the occupant side panel 25 becomes relatively low (tension is not applied) (FIG. 3). Then the cover 42 is pushed by the internal pressure of the airbag main body 22 to the outside the base panel 26. The bent portion 51 stands to form the gap between the cover 42 and the airbag main body 22 so that the gas is discharged while being regulated from the vent hole 41 by the cover 42 (FIGS. 6A, 7A, 7B). As a result, the internal pressure of the airbag 10 (airbag main body 22) is reduced to become relatively low.

In the embodiment, the tether 43 has its one end connected to the cover 42 via the vent hole 41, and the other end connected to the airbag main body 22. The structure ensures to open the vent hole 41 for discharging the gas outside in the state where the tether 43 is not pulled by the airbag main body 22, in other words, in the non-deployed state (folded state) of the airbag main body 22, or in the state where the occupant A is restrained. Meanwhile, in the state where the tether 43 is pulled by the airbag main body 22 which has been deployed by the gas introduced into the air chamber 21, the cover 42 is partially drawn into the vent hole 41 so that the cover 42 is reliably brought into tight contact with the edge of the vent hole 41. This ensures to close the vent hole 41. The hole for insertion of the tether 43, for example, other than the vent hole 41 is not required, and accordingly, the gas leakage is unlikely to occur. That is, the internal pressure of the airbag main body 22 may be appropriately set by reliably opening and closing the vent hole 41.

At the end of deployment of the airbag main body 22, the cover 42 may be brought into tight contact with the portion where the part of the airbag main body 22 (air chamber 21) located at outside position is overlaid with the base panel 26 so that the part located at the vent hole 41 is drawn to the inside of the air chamber 21 (airbag main body 22). Therefore, the peripheral edge of the vent hole 41 is likely to receive the surface pressure, resulting in the structure unlikely to cause the gas leakage.

The cover 42 is directly pulled by the tether 43 in the vent hole 41, which allows transmission of the tensile force to the cover 42 efficiently, thus suppressing the tensile force for generating the specified sealing effect.

The tether 43 is connected between a pair of cover main bodies 52, 52 which are positioned on the edge of the vent hole 41 and face each other. Thus, if the tether 43 is pulled by the deployment of the airbag main body 22, the respective cover main bodies 52 may be drawn from both sides with respect to the vent hole 41. This allows the cover 42 to reliably seal the vent hole 41.

The cover 42 is made to have the longitudinal dimension L2 at the center of the lateral ends which faces the vent hole 41 shorter than the longitudinal dimension L1 between the lateral ends to be fixed to the airbag main body 22. The aforementioned structure allows the cover 42 to be drawn to the inside (air chamber 21) of the airbag main body 22 from the vent hole 41 easily upon application of the tension to the tether 43 as well as to suppress wrinkles.

The shape of the vent hole 41 is stabilized by the patch cloth 47 to ensure sealing of the vent hole 41 with the cover 42.

The flexible bent portion 51 of the cover 42 abuts on the airbag main body 22 to generate the gap between the airbag main body 22 and the cover 42. Therefore, in the state where the cover 42 is not pulled by the tether 43, the bent portion 51 works to prevent the cover 42 from completely sealing the vent hole 41, thus allowing the gas to be discharged from the vent hole 41 reliably. Further, in the state where the cover 42 is pulled by the tether 43, the bent portion 51 is flexibly deformed so as not to interrupt sealing of the vent hole 41 by the cover 42.

Furthermore, the member less deformable than the one for forming the airbag main body 22 (base panel 26) is used for forming the cover 42. The cover 42 is then allowed to deform the airbag main body 22 (base panel 26) around the vent hole 41 in association with the cover 42 as the tether 43 draws a part of the cover 42 into the vent hole 41. This makes it possible to bring the cover 42 into tight contact with the vent hole 41 more reliably so as to seal the vent hole 41 more reliably.

The airbag device 11 includes the aforementioned airbag 10 so as to allow appropriate setting of the internal pressure of the airbag main body 22 by suitably adjusting opening and closing of the vent hole 41. As a result, the airbag device 11 ensures protection of the occupant more reliably.

A second embodiment will be described referring to FIGS. 8A and 8B. The similar structures and functions to those described in the first embodiment will be designated with the same codes, and explanations thereof, thus will be omitted.

The second embodiment is configured to have sub-exhaust holes 56 formed respectively in the cover main bodies 52, 52 of the cover 42 according to the first embodiment.

Figure 8A:
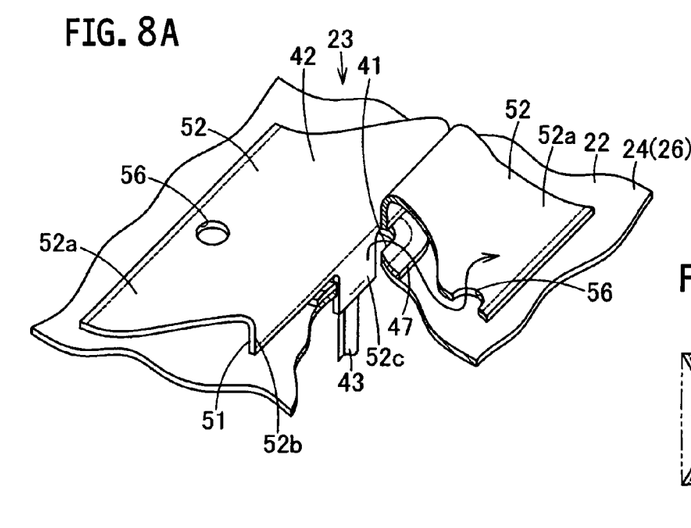
FIG. 8A is a perspective view partially illustrating a state where the tension of the connector is relatively low, in a second embodiment of the airbag of the present invention.
Figure 8B:
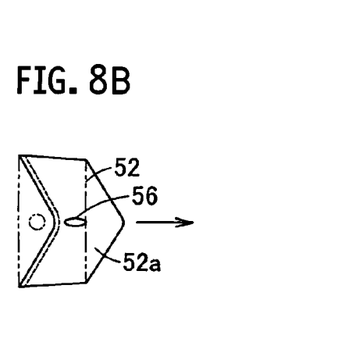
FIG. 8B is a plan view partially illustrating the state where the tension is applied to the connector, in the second embodiment of the airbag of the present invention.

Each of those sub-exhaust holes 56 is, for example, a circular opening formed in the center of the main body 52*a* in the longitudinal direction so that the gas from the vent hole 41 can be partially discharged (FIG. 8A).

As the airbag 10 (airbag main body 22) is expanded and deployed, the tether 43 that is kept loosened in the non-deployed state is pulled by the occupant side panel 25 via the catch panel 44 to bear the tension force. Then the cover 42 is pulled toward the vent hole 41. In this state, as the sub-exhaust holes 56, 56 are formed as openings in the main bodies 52*a*, 52*a* of the cover main bodies 52, 52, the cover 42 is pulled by the tether 43 so as to be easily extended (FIG. 8B). The bent portion 51 falls down to deform the cover 42 (cover main bodies 52, 52), allowing the part around the tabs 52*c*, 52*c* to be drawn to the inside of the vent hole 41. The part around the tabs 52*c*, 52*c* will be positioned inside the airbag main body 22 (air chamber 21). In the state where the cover 42 (cover main bodies 52, 52) overlaid with the airbag main body 22 covers the vent hole 41, the main bodies 52*a*, 52*a* are brought into contact with the peripheral edge of the vent hole 41 under pressure. The cover 42 then seals the vent hole 41.

In the case where the occupant side panel 25 of the deployed airbag 10 (airbag main body 22) receives and restrains the occupant A thrown forward so as to alleviate the impact exerted to the occupant A, the occupant side panel 25 is pushed by the occupant A to make the tension to the tether 43 relatively low (no tension is applied). At this moment, the cover 42 is pushed outside the base panel 26 under the internal pressure of the airbag main body 22 so that the bent portion 51 stands to form the gap between the cover 42 and the airbag main body 22, through which the gas is discharged from the vent hole 41. The exhaust gas is regulated by the cover 42, and discharged from the gap between the longitudinal ends of the cover 42 and the base panel 26, and the sub-exhaust hole 56 communicating with the gap.

The sub-exhaust hole 56 is formed in the cover 42 so that the exhaust gas from the vent hole 41 may be discharged further effectively, and the cover 42 pulled by the deployment of the airbag main body 22 via the tether 43 is likely to be easily extended. This allows the cover 42 to be drawn into the vent hole 41 more easily, and brought into tight contact with the vent hole 41 more reliably so as to seal the vent hole 41 more reliably.

A third embodiment will be described referring to FIGS. 9A, 9B and 9C. The similar structures and functions to those described in the respective embodiments will be designated with the same codes, and explanations thereof, thus will be omitted.

The third embodiment is configured that the cover 42 according to the first embodiment is made from the single sheet of the base fabric (cover main body 57).

Figure 9A:
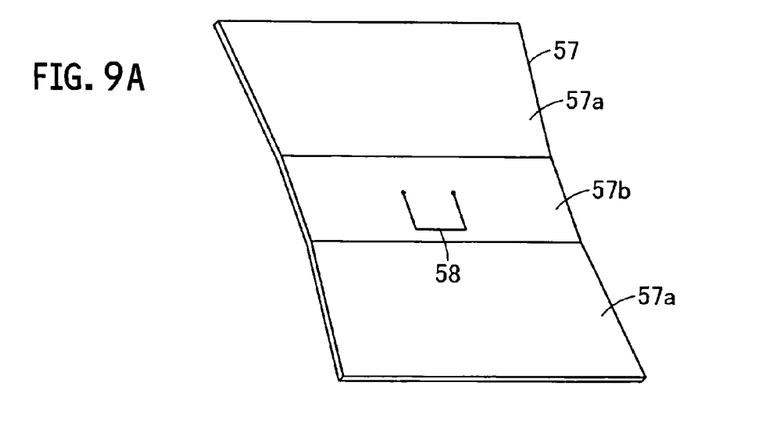
FIG. 9A is a perspective view showing a member which constitutes the lid, in a third embodiment of the airbag of the present invention.
Figure 9B:
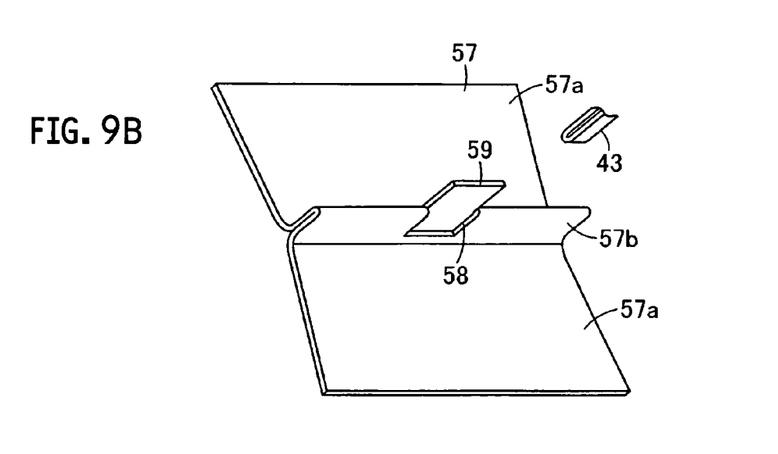
FIG. 9B is a perspective view showing the formed lid, in the third embodiment of the airbag of the present invention.
Figure 9C:
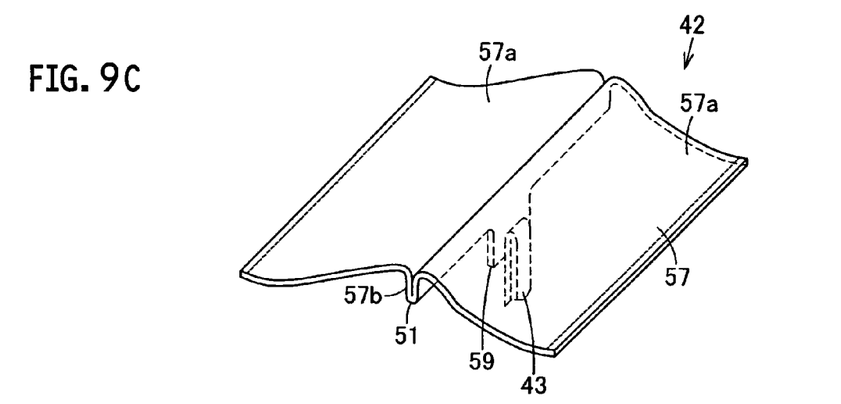
FIG. 9C is a perspective view illustrating the state where the lid is connected with the connector, in the third embodiment of the airbag of the present invention.

The cover main body 57 constituting the cover 42 as the woven base fabric formed of nylon (nylon 66), for example, has a quadrangle shape integrally combined with substantially quadrangle (trapezoidal) main bodies 57*a*, 57*a*, and a quadrangle continuous portion 57*b* contiguous with the main bodies 57*a*, 57*a* therebetween (FIG. 9A).

Each of the main bodies 57*a* is formed so that the longitudinal dimension is gradually reduced toward the continuous portion 57*b*.

The continuous portion 57*b* has the quadrangle shape contiguous with the main bodies 57*a*, 57*a* therebetween in the lateral direction. It is bent in the lateral direction to be deflected to make a tuck-like portion so as to be joined by sewing, for example. Then the bent portion 51 of the cover 42 is produced (FIG. 9B). The continuous portion 57b has a cut portion 58 with U-like curve in the lateral direction at substantially the longitudinal center, that is, the center of the bent portion 51. As the continuous portion 57b is bent to deflect like the tuck-shape, the continuous portion 57b is partially cut to stand from the cut portion 58. As a result, the tongue-like tab 59 is formed as the connector portion joined with both ends of the tether 43 by sewing, for example (FIG. 9C). The tab 59 has a width dimension smaller than the longitudinal dimension of the vent hole 41 so that it is drawn to the inside of the airbag main body 22 from the vent hole 41.

In this way, the cover 42 is formed by the single sheet of the cover main body 57 so that the increase in the number of components is suppressed, and the gas distribution mechanism 23 may be manufactured at a lower cost.

In the third embodiment, it is possible to form the sub-exhaust hole 56 similar to the second embodiment in the main body 57a.

A fourth embodiment will be described referring to FIGS. 10A, 10B and 10C. The similar structures and functions to those described in the respective embodiments will be designated with the same codes, and explanations thereof, thus will be omitted.

The fourth embodiment is configured that the cover 42 is formed by the single sheet of the base fabric, and portions around four corners of the cover are only joined with the airbag main body 22 by sewing, for example, and the remaining part (respective sides) are not joined.

Figure 10A:
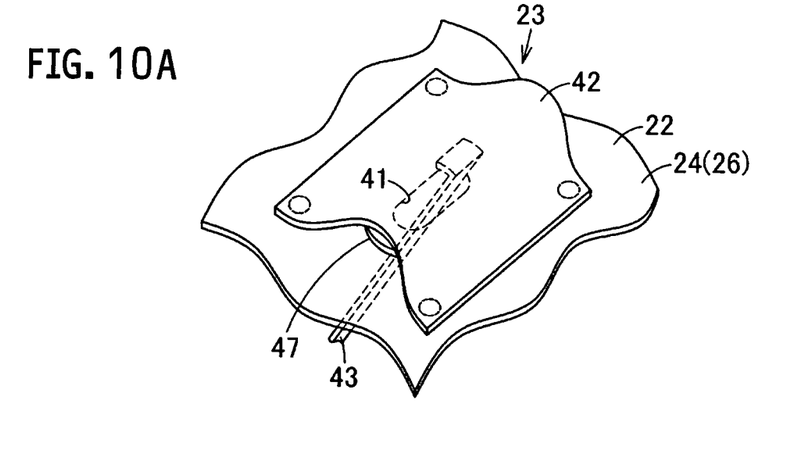
FIG. 10A is a perspective view partially illustrating the state where the tension of the connector is relatively low, in a fourth embodiment of the airbag of the present invention.
Figure 10B:
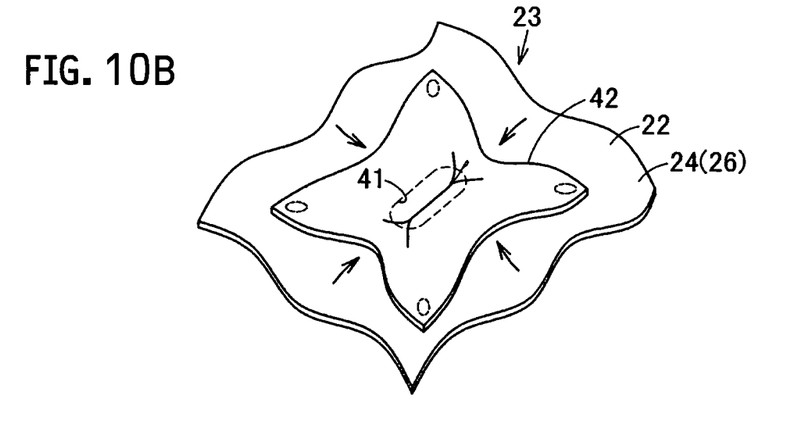
FIG. 10B is a perspective view partially illustrating the state where the tension is applied to the connector, in the fourth embodiment of the airbag of the present invention.
Figure 10C:
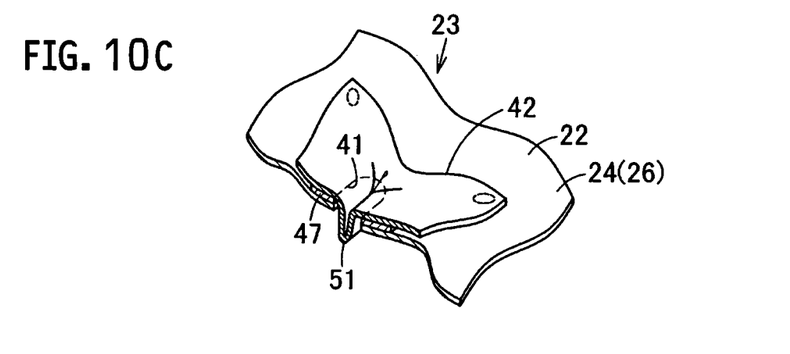
FIG. 10C is a sectional view of FIG. 10B.

One end of the tether 43 inserted into the vent hole 41 is joined with substantially the center part of the cover 42 by sewing, for example, so as to be connected (FIG. 10A). The other end of the tether 43 may be suitably folded back into the loop and joined (not shown) so as to be connected to the loop-like arms 44b, 44b of the catch panel 44.

As the airbag 10 (airbag main body 22) is expanded and deployed, the tether 43 that is kept loosened in the non-deployed state is pulled by the occupant side panel 25 via the catch panel 44 to bear the tension force. Then the cover 42 is pulled toward the vent hole 41. As the cover 42 is joined with the base panel 26 only at the four corners, the respective sides are easily drawn toward the vent hole 41 (FIGS. 10B and 10C) so as to be located in the airbag main body 22 (air chamber 21). In the state where the cover 42 (cover main bodies 52, 52) is overlaid with the airbag main body 22 to cover the vent hole 41, the main bodies 52a, 52a are brought into contact with the peripheral edge of the vent hole 41 under pressure so as seal the vent hole 41.

Meanwhile, in the case where the occupant side panel 25 is pushed by the restrained occupant A to cause the tension applied to the tether 43 to be relatively low (tension is not applied), the cover 42 is pushed outside the base panel 26 under the internal pressure of the airbag main body 22. The gas from the vent hole 41 is regulated by the cover 42 and discharged through the gap between the cover 42 and the airbag main body 22.

As the cover 42 is joined with the base panel 26 (airbag main body 22) at points of four corners, the cover 42 which has been pulled by the deployment of the airbag main body 22 via the tether 43 is easily drawn to the vent hole 41. Then the cover 42 is ensured to be brought into tight contact with the vent hole 41 so as to seal the vent hole 41 more reliably.

Figure 11:
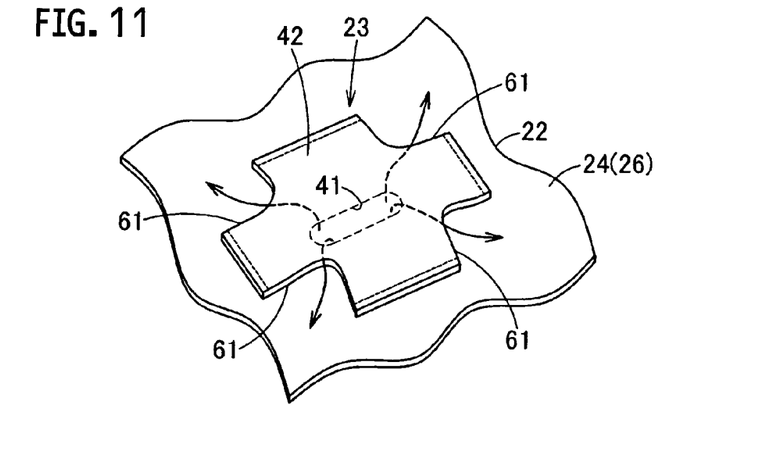
FIG. 11 is a perspective view partially illustrating a fifth embodiment of the airbag of the present invention.

Likewise a fifth embodiment shown in FIG. 11, it may be configured that notches 61 are formed at the four corners of the cover 42 so that the side portions except those four notches 61 are joined with the airbag main body 22 by sewing, for example. In such a case, the gas discharged from the vent hole 41 that is opened in the loosened state of the tether 43 is regulated by the cover 42 so that the gas can be effectively discharged from the notches 61 at the four corners of the cover 42.

Figure 12A:
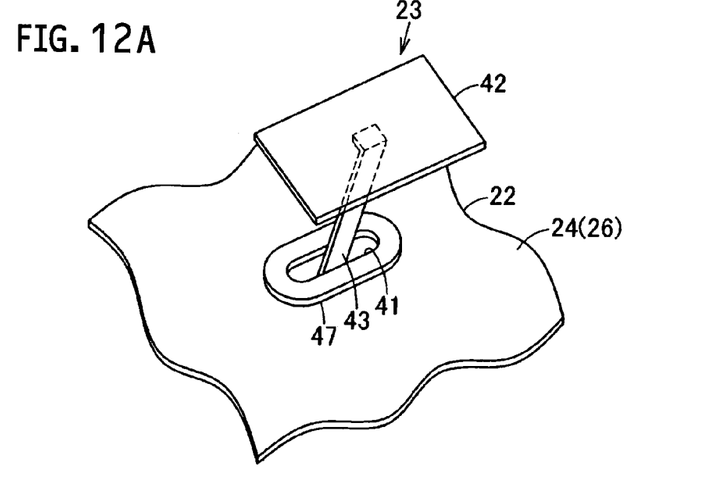
FIG. 12A is a perspective view partially illustrating the state where the tension of the connector is relatively low, in a sixth embodiment of the airbag of the present invention.
Figure 12B:
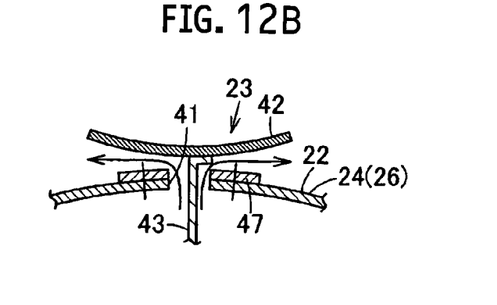
FIG. 12B is a sectional view of FIG. 12A.
Figure 12C:
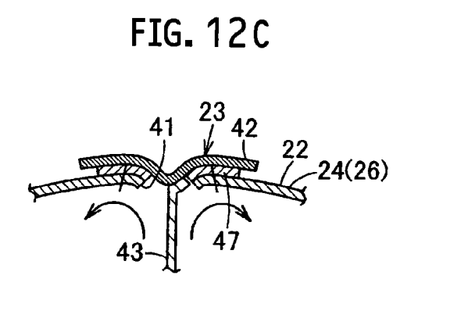
FIG. 12C is a sectional view partially illustrating the state where the tension is applied to the connector, in the sixth embodiment of the airbag of the present invention.

Likewise a sixth embodiment shown in FIGS. 12A, 12B and 12C, it may be configured that the cover 42 is not joined with the airbag main body 22. In such a case, the woven base fabric made from nylon (nylon 66) that is less deformable than the base fabric (member) for forming the base panel 26 may be used for forming the cover 42.

In this embodiment, the cover main body 57 (cover 42) is made of nylon 66 of 940 dtex, and the base fabric constituting the base panel 26 is made of nylon 66 of 470 dtex. As the airbag 10 (airbag main body 22) is expanded and deployed, the tether 43 that is kept loosened in the non-deployed state is pulled by the occupant side panel 25 via the catch panel 44 to apply the tension force to the cover 42. Then the cover 42 is pulled toward the vent hole 41, and the part of the cover 42 at substantially the center connected to the tether 43 is easily drawn toward the vent hole 41 (FIG. 12C). As a result of the drawing, the part of the cover 42 at substantially the center connected to the tether 43 is located inside the airbag main body 22 (air chamber 21). In the state where the cover 42 (cover main bodies 52, 52) overlaid with the airbag main body 22 covers the vent hole 41, the main bodies 52a, 52a are brought into contact with the peripheral edge of the vent hole 41 under pressure. Accordingly, the cover 42 seals the vent hole 41.

Meanwhile, in the case where the occupant side panel 25 is pushed by the restrained occupant A to cause the tension applied to the tether 43 to be relatively low (tension is not applied), the cover 42 is pushed outside the base panel 26 (FIGS. 12A and 12B) under the internal pressure of the airbag main body 22. The gas from the vent hole 41 is regulated by the cover 42 and discharged through the gap between the cover 42 and the airbag main body 22.

As the cover 42 is not joined with the airbag main body 22, manufacturability of the airbag 10 may further be improved. The cover 42 is made from the member that is less deformable than the one for forming the airbag main body 22 (base panel 26) so that a part of the cover 42 drawn into the vent hole 41 by the tether 43 deforms the airbag main body 22 (base panel 26) around the vent hole 41 in association with the cover 42. Even if the cover 42 is not joined with the airbag main body 22, the cover 42 is allowed to be brought into tight contact with the vent hole 41 so as to seal the vent hole 41 more reliably.

The fourth to the sixth embodiments as described above may be configured to have the bent portion 51 likewise the third embodiment.

Likewise the first embodiment, the cover 42 may be formed by joining the cover main bodies 52, 52.

In the aforementioned embodiments, the cover 42 may be formed from three or more sheets of base fabric.

It has been described that the cover 42 is configured to have the longitudinal dimension L2 at the center in the lateral direction shorter than the dimension L1 in the width direction. However, the cover 42 may be configured to have simply the quadrangle shape.

While embodiments of the present invention have been described hereinabove, these embodiments are merely illustration described for the purpose of facilitating the understanding of the present invention, and the present invention is not limited to the embodiments. The technical scope of the present invention is not limited to the specific technical matters disclosed in the embodiments but includes various modifications, changes, alternative techniques, and the like which can readily be conceived therefrom.

The entire content of Japanese Patent Application No. 2014-135210 (filed on Jun. 30, 2014) is incorporated herein by reference.

INDUSTRIAL APPLICABILITY

The airbag according to the present invention is applicable to the airbag of the airbag device for a driver, which is installed in the steering wheel, for an occupant sitting on the front seat, which is installed in the instrument panel, and for an occupant sitting on the rear seat, which is installed in the rear part of the seat, and further to the airbag of the airbag device for absorbing the impact exerted to the occupant.

REFERENCE SIGNS LIST 10 airbag
11 airbag device
12 inflator
21 air chamber
22 airbag main body
23 gas distribution mechanism
41 vent hole (exhaust hole)
42 cover (lid)
43 tether (connector)
51 bent portion (spacer)
52 cover main body (lid main body)

What is claimed is:

1. An airbag comprising:
   an airbag main body including an air chamber which expands from a folded state by introduced gas; and
   a gas distribution mechanism disposed on the airbag main body for controlling quantity of gas to be discharged from the air chamber to outside in accordance with a deployment state of the airbag main body, wherein:
   the gas distribution mechanism includes:
      an exhaust hole communicating with the air chamber and opened in the airbag main body;
      a lid located outside the air chamber in the airbag main body with respect to the exhaust hole; and
   a connector having one end connected to the lid via the exhaust hole, and the other end connected to the airbag main body for drawing a part of the lid into the exhaust hole by the deployment of the airbag main body, wherein
   the lid is larger than the exhaust hole, and joined with the outside of the airbag main body,
   the lid is configured to cover and seal the exhaust hole from the outside of the airbag when the airbag is expanded and deployed.

2. The airbag according to claim 1, wherein:
   the lid includes a pair of lid main bodies which are located on the edge of the exhaust hole and face each other; and
   the connector is connected between the lid main bodies.

3. The airbag according to claim 1, wherein the lid is formed of a member less deformable than a member constituting the airbag main body.

4. An airbag device comprising:
   an airbag according to claim 1; and
   an inflator for supplying gas into the air chamber of the airbag.

5. The airbag according to claim 1, wherein
   the lid includes a tab as a part of the lid,
   the tab of the lid has a width dimension smaller than a longitudinal dimension of the exhaust hole, and
   when the airbag is expanded and deployed, the tab is drawn to the inside of the airbag main body and the other part of the lid except for the tab covers and seals the exhaust hole from outside of the airbag.

6. An airbag comprising:
   an airbag main body including an air chamber which expands from a folded state by introduced gas; and
   a gas distribution mechanism disposed on the airbag main body for controlling quantity of gas to be discharged from the air chamber to outside in accordance with a deployment state of the airbag main body, wherein:
   the as distribution mechanism includes:
      an exhaust hole communicating with the air chamber and opened in the airbag main body;
      a lid located outside the air chamber in the airbag main body with respect to the exhaust hole; and
      a connector having one end connected to the lid via the exhaust hole, and the other end connected to the airbag main body for drawing a part of the lid into the exhaust hole by the deployment of the airbag main body, wherein
   the lid includes a flexible spacer which abuts on the airbag main body while facing the outside of the airbag main body to form a gap between the spacer and the airbag main body.

* * * * *